United States Patent
Lu

(10) Patent No.: US 12,431,284 B2
(45) Date of Patent: Sep. 30, 2025

(54) FLEXIBLE RF COIL AND METHOD FOR MANUFACTURING FLEXIBLE RF COIL

(71) Applicant: Beijing Dream Ink Technologies Co., Ltd., Beijing (CN)

(72) Inventor: Shuanghao Lu, Beijing (CN)

(73) Assignee: Beijing Dream Ink Technologies Co., Ltd., Beijing (CN)

( * ) Notice: Subject to any disclaimer, the term of this patent is extended or adjusted under 35 U.S.C. 154(b) by 229 days.

(21) Appl. No.: 17/767,833

(22) PCT Filed: Oct. 20, 2021

(86) PCT No.: PCT/CN2021/124885
§ 371 (c)(1),
(2) Date: Apr. 8, 2022

(87) PCT Pub. No.: WO2022/089270
PCT Pub. Date: May 5, 2022

(65) Prior Publication Data
US 2023/0368971 A1 Nov. 16, 2023

(30) Foreign Application Priority Data
Oct. 26, 2020 (CN) .......................... 202011154919.8

(51) Int. Cl.
H01F 27/28 (2006.01)
H01F 41/04 (2006.01)

(52) U.S. Cl.
CPC .................. H01F 41/041 (2013.01)

(58) Field of Classification Search
CPC ...... H01F 41/041; H01F 5/003; H01F 41/043; H01F 2017/006; H01F 17/0006; Y02P 10/25
(Continued)

(56) References Cited

U.S. PATENT DOCUMENTS

| 9,930,773 B2 * | 3/2018 | Holbery .................. H05K 1/092 |
| 2017/0367179 A1 | 12/2017 | Holbery et al. |
| 2019/0035533 A1 * | 1/2019 | Lee ........................ H01F 41/122 |

FOREIGN PATENT DOCUMENTS

| CN | 206024138 U | 3/2017 |
| CN | 107938369 A | 4/2018 |

(Continued)

OTHER PUBLICATIONS

CN Office Action dated Sep. 1, 2022 issued in CN Application No. 2020111549198.

(Continued)

*Primary Examiner* — Shawki S Ismail
*Assistant Examiner* — Kazi S Hossain
(74) *Attorney, Agent, or Firm* — Weaver Austin Villeneuve & Sampson LLP

(57) ABSTRACT

Provided is a flexible RF coil and a method for manufacturing a flexible RF coil. The flexible RF coil includes: a first fabric layer, a first adhesive film layer, a RF printing layer, a second adhesive film layer and a second fabric layer. The first adhesive film layer is composited on surface of the first fabric layer. The second adhesive film layer is composited on surface of the second fabric layer. The RF printing layer is encapsulated between the first adhesive film layer and the second adhesive film layer, and includes a mask not wet by the liquid metal, and a liquid metal coil formed in a coil-shaped groove reserved in the mask. Through the present disclosure, an ultra-flexible flexible RF coil is formed by using flexible characteristics of liquid metal and fabric, and wearable comfort of user is improved, thereby improving the user's experience.

7 Claims, 4 Drawing Sheets

(58) Field of Classification Search
USPC .......................................... 336/200, 232, 192
See application file for complete search history.

(56) References Cited

FOREIGN PATENT DOCUMENTS

| CN | 110146200 A | | 8/2019 | |
|---|---|---|---|---|
| CN | 110351906 A | * | 10/2019 | ............... B32B 5/02 |
| CN | 110545626 A | | 12/2019 | |
| CN | 110611159 A | | 12/2019 | |
| CN | 111148294 A | | 5/2020 | |
| CN | 111385978 A | | 7/2020 | |
| CN | 211404738 U | | 9/2020 | |
| WO | WO2019/055680 A1 | | 3/2019 | |

OTHER PUBLICATIONS

CN ISR dated (unknown) issued in CN Application No. PCT/CN2021/124885 [English translation not available].
Chinese Notice of Allowance dated Mar. 24, 2023 issued in CN Application No. 202011154919.8.
CN Written Opinion dated Jan. 17, 2022 in PCT Application No. PCT/CN2021/124885 (with English Translation).

* cited by examiner

FLEXIBLE RF COIL AND METHOD FOR MANUFACTURING FLEXIBLE RF COIL

CROSS-REFERENCE TO RELATED APPLICATIONS

The present application is a National Stage Application, filed under 35 U.S.C. 371, of International Patent Application No. PCT/CN2021/124885, filed on Oct. 20, 2021, which claims priority to Chinese patent application No. 202011154919.8, filed on Oct. 26, 2020, the contents of both of which are incorporated herein by reference in their entirety.

TECHNICAL FIELD

The present disclosure relates to the field of RF (radio frequency) electronics, and particularly, relates to a flexible RF coil and a method for manufacturing a flexible RF coil.

BACKGROUND

RF coils have played a key role in many fields such as wireless charging, communication antennas, medical treatment, and the like. With continuous development of technologies and continuous updating of requirements, current development requirements of RF coils are focused on wearable devices such as flexible fabric, which brings new requirements for flexibility and adhesion of the RF coils.

At present, RF coils such as FPC RF coils are mainly obtained by etching copper clad laminates, and the base materials are mainly PI (polyimide) films. However, such coils have poor flexibility and comfort due to poor adhering of the PI base materials, and poor tensile property, resulting in undesired overall wearing experience for users.

SUMMARY

An object of the present disclosure is to provide a flexible RF coil to solve the problem of undesired user wearing experience of the flexible RF coil in the related art.

In some embodiments, the flexible RF coil includes: a first fabric layer, a first adhesive film layer, a RF printing layer, a second adhesive film layer and a second fabric layer. The first adhesive film layer is composited on a surface of the first fabric layer, the second adhesive film layer is composited on a surface of the second fabric layer. The RF printing layer includes a mask not wet by a liquid metal, and a liquid metal coil formed in a coil-shaped groove reserved in the mask.

In some embodiments, the flexible RF coil further includes: one or more FPC connectors between the first adhesive film layer and the second adhesive film layer, wherein a first end of each of the FPC connectors is lapped with the liquid metal coil, and a second end of each of the FPC connectors is led out from the first fabric layer or the second fabric layer.

In some embodiments, leading out the second end of the FPC connector from the first fabric layer and/or the second fabric layer includes: a position of the first fabric layer and/or a position of the second fabric layer relative to the second end of the FPC connector is a window structure, and the end of the FPC connector is exposed from the window structure.

In some embodiments, a region of the first fabric layer and/or the second fabric layer that is lapped with the liquid metal coil relative to the FPC connector is a non-stretchable hardening region.

In some embodiments, the first fabric layer and/or the second fabric layer is a fabric blended by polyester and spandex with stretchable extent of 5%-15%.

In some embodiments, the first adhesive film layer and/or the second adhesive film layer is a thermoplastic adhesive film or a pressure-sensitive adhesive film.

In some embodiments, the mask not wet by the liquid metal is a patterned carbon powder layer printed by a laser printer.

In some embodiments, at least conductive metal particles are mixed in the liquid metal.

Another object of the present disclosure is to propose a method for manufacturing a flexible RF coil, so as to solve the problems of complex process, low efficiency, and unfavorable environmental protection in the related art.

In some embodiments, the method for manufacturing a flexible radio frequency coil includes: step 1 of providing a first composite substrate consisting of a first fabric layer and a first adhesive film layer; step 2 of forming a mask not wet by a liquid metal on a surface of the first adhesive film layer of the first composite substrate, wherein a coil-shaped groove is formed in the mask; step 3 of printing a liquid metal paste on a surface of the mask, so that the liquid metal paste is filled in the groove of the mask to form a liquid metal coil; step 4 of providing a second composite substrate consisting of a second fabric layer and a second adhesive film layer; and step 5 of aligning and compositing a side of the second adhesive film layer of the second composite substrate to a side of the first adhesive film layer of the first composite substrate.

In some embodiments, subsequent to step 3 and prior to step 4, the method further includes step 3.5 of lapping one or more FPC connectors on the liquid metal coil, so that the liquid metal coil is lapped with the first end of the FPC connector.

In some embodiments, subsequent to step 4 and prior to step 5, the method further includes step 4.5 of performing a window opening process at a position of the second composite substrate relative to a second end of the FPC connector to form a window structure exposing the second end of the FPC connector.

Compared with the related art, the present disclosure provides the following advantages:

According to the present disclosure, the flexible RF coil encapsulates liquid metal through a composited substrate formed by fabrics and adhesive films, so that the obtained flexible RF coil is ultra-flexible due to the characteristics of the liquid metal and flexibility of the fabrics. In addition, the fabric surface is beneficial to improving the user's wearing comfort, thereby improving the user's experience.

DESCRIPTION OF EMBODIMENTS

The following description and drawings sufficiently illustrate specific embodiments of the present disclosure to enable those skilled in the art for implementation. Other embodiments may include structural, logical, electrical, procedural changes, and other alternatives. The examples only show possible variations. Unless otherwise noted, individual components and functions are optional and order of operations may be varied. Portions and features of some embodiments may be included in other embodiments or substituted by portions and features of other embodiments. The scope of embodiments of the present disclosure is defined by the claims and all available equivalents thereof. These embodiments of the present disclosure may be referred to herein by the term "invention" individually or collectively for convenience. If more than one invention is actually disclosed, the scope of the present disclosure does not automatically limit the present disclosure to any single invention or inventive concept.

It should be noted that various technical features in embodiments of the present disclosure can be combined with each other without conflict.

Figure 1:
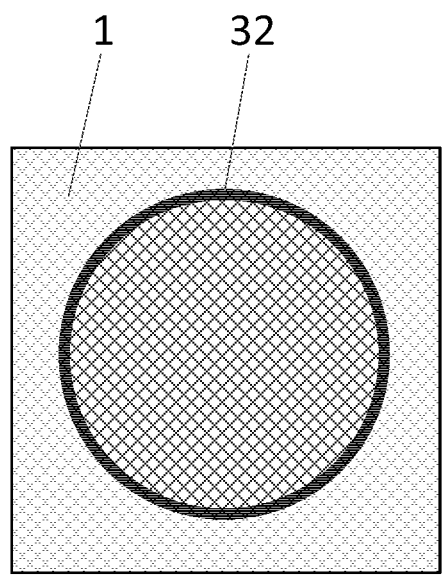
FIG. 1 is a structural schematic diagram of a flexible RF coil according to an embodiment of the present disclosure.
Figure 2:
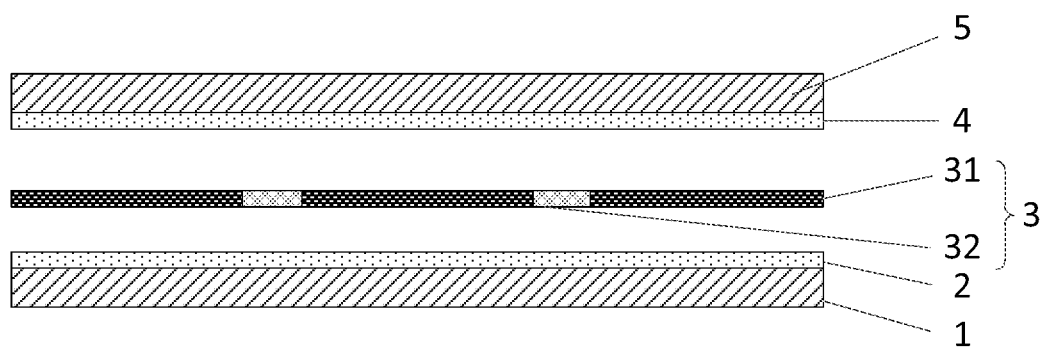
FIG. 2 is a schematic diagram of a layer structure of a flexible RF coil according to an embodiment of the present disclosure.
Figure 3:
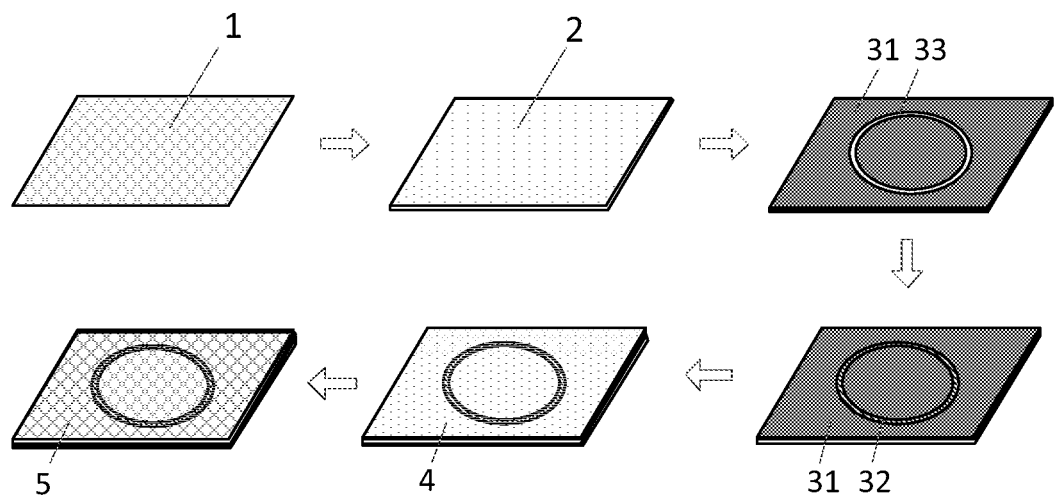
FIG. 3 is a process diagram of a flexible RF coil according to an embodiment of the present disclosure.

A first aspect of the present disclosure provides a flexible RF coil. FIG. 1 is a structural schematic diagram of a flexible RF coil according to an embodiment of the present disclosure, FIG. 2 is a schematic diagram of a layer structure of a flexible RF coil according to an embodiment of the present disclosure, and FIG. 3 is a process diagram of a flexible RF coil according to an embodiment of the present disclosure. As shown in FIG. 1, FIG. 2 and FIG. 3, the flexible RF coil 100 includes a first fabric layer 1, a first adhesive film layer 2, a RF printing layer 3, a second adhesive film layer 4 and a second fabric layer 5. The first adhesive film layer 2 is composited on a surface of the first fabric layer 1, and the second adhesive film layer 4 is composited on a surface of the second fabric layer 5. The RF printing layer 3 is encapsulated between the first adhesive film layer 2 and the second adhesive film layer 4. The RF printing layer 3 includes a mask 31 not wet by a liquid metal, and a liquid metal coil 32. The liquid metal coil 32 is formed in a coil-shaped groove 33 reserved in the mask 31.

According to embodiments of the present disclosure, the flexible RF coil encapsulates liquid metal through a composited substrate formed by fabrics and adhesive films, so that the obtained flexible RF coil is ultra-flexible due to the characteristics of the liquid metal and flexibility of the fabrics. In addition, the fabric surface is beneficial to improving the user's wearing comfort, thereby improving the user's experience.

The liquid metal coil 32 in embodiments of the present disclosure may be a circular coil, a square coil, or a coil with other structures, and its specific shape may be designed according to its functional requirements and application scenario.

The liquid metal in embodiments of the present disclosure is a metal with a low melting point that is liquid state at room temperature. In some embodiments, the liquid metal can be a simple substance or an alloy of metals with a melting point below 30° C., which is not limited to gallium, gallium-indium eutectic alloy, gallium-tin eutectic alloy, gallium indium tin eutectic alloy, gallium indium tin zinc eutectic alloy, and the like.

Manners for forming the liquid metal in embodiments of the present disclosure are not limited to printing, cladding, spraying, dipping, and the like.

In some embodiments, the liquid metals in embodiments of the present disclosure is a liquid metal paste mixed with conductive metal particles, and the conductive metal particles are not limited to gold, silver, copper, aluminum, silver-coated copper, and the like. In embodiments of the present disclosure, by mixing conductive metal particles into the liquid metal, on the one hand, the surface tension of the liquid metal can be greatly reduced, its adhesion can be improved, so that the requirements of upper roller printing and penetrating screen can be met, thereby avoiding line retraction and ball retraction. On the other hand, the conductivity of the liquid metal can be improved, thereby reducing its impedance.

In some embodiments, the conductive metal particles in the liquid metal slurry in embodiments of the present disclosure account for 4%-10% of a total mass of the liquid metal slurry. The liquid metal slurry under this ratio is thick, and the surface tension of the liquid metal is adjusted to meet the printing requirements well, so that it can be attached to the roller for coating and printing, and the screen-passing requirements of screen printing can be met.

In embodiments of the present disclosure, the first fabric layer 1 and/or the second fabric layer 5 can be made from non-woven fabric, nylon, washable cotton, polyester, spandex, and fabric blended with various materials. In some embodiments, the first fabric layer 1 and the second fabric layer 5 are made from a fabric blended by polyester and spandex. The yarn count of the fabric layer has a thickness between 30-100 D (unit: denier).

One of the functions of the fabric on the composite substrate in embodiments of the present disclosure is to provide a certain structural strength, control the overall stretchable extent of the flexible substrate, and avoiding the reduction of the structural stability of the formed flexible stretchable circuit due to excessively large stretchable extent. As a result, the maximum stretchable extent of the flexible and stretchable composite substrate does not affect the structural stability of the subsequent liquid metal coils and electronic devices.

The stretchable extent of general fabric does not exceed 100%, which is far lower than the adhesive film. By combining the general fabric and the adhesive film, the stretchable extent of the flexible composite substrate can be maintained to be basically consistent with the stretchable extent of the fabric, so that excessive stretching is avoided, thereby achieving the stability of the liquid metal coil and electronic devices.

The first adhesive film layer 2 and/or the second adhesive film layer 4 in embodiments of the present disclosure can be made from thermoplastic adhesive films or pressure-sensitive adhesive films, such as polyurethane PU, thermoplastic polyurethane TPU, thermoplastic vulcanized rubber TPV, silica gel, and the like. The adhesive film layer in embodiments of the present disclosure has its own flexible and stretchable properties, and its functions reflected in the composite substrate formed with the fabric is not limited to one or more of: reducing/eliminating the pores of the fabric, improving the adhesive force of the liquid metal on the adhesive film, smoothing the surface of the fabric and improving certain tensile restoring force.

In some embodiments, the fabric in embodiments of the present disclosure is a fabric with stretchable extent of not less than 1% and not higher than 30%. The flexible and stretchable composite substrate made of the fabric has the effect of high stability, so that the flexible and stretchable circuit made by the flexible and stretchable composite substrate can meet the requirements of medium and low stretching, and has a long service life and is not easily damaged. In some embodiments, the selected fabric in embodiments of the present disclosure is a polyester fabric with stretchable extent of not less than 5% and not higher than 15%, it has strong structural stability after compositing, and its surface is suitable for attaching to the skin, which can improve the user's wearing experience.

The stretchable extent in embodiments of the present disclosure refers to a stretchable range of the substrate compared to a normal relaxation state.

In some embodiments, the first fabric layer in embodiments of the present disclosure has a thickness of 0.05-0.15 mm; the second fabric layer has a thickness of 0.05-0.15 mm; the first adhesive film layer has a thickness of 0.05-0.15 mm; the second adhesive film layer has a thickness of 0.05-0.15 mm; the liquid metal coil has a thickness of 0.01-0.05 mm; the carbon powder layer has a thickness of 0-0.005 mm. After the flexible RF coil in embodiments of the present disclosure is composited by using the layers with the above thickness, the overall thickness of the flexible RF coil can be 0.45-0.65 mm, thereby ensuring the structural stability and improving the user's wearing experience and quality reliability while keeping an extremely thin thickness.

In embodiments of the present disclosure, the mask 31 not wet by the liquid metal can be a patterned carbon powder layer. The patterned carbon powder layer includes a coil-shaped groove for filling the liquid metal. The carbon powder layer can achieve pattern printing by a traditional laser printer without other intermediate masks, so that the process is simple and mature, the cost is low, and the precision is high. The carbon powder layer can use different colors according to user's requirements, thereby improving the user's visual sensory experience. In other embodiments of the present disclosure, the mask 31 not wet by the liquid metal can also be made of other materials not wet by the liquid metal, and is not limited to polytetrafluoroethylene, paraffin, and the like.

The flexible RF coils in the embodiments of the present disclosure can be applied to wireless charging coils, magnetic resonance coils, RFID antennas, traditional antennas, NFC antennas, and the like. For the RFID antennas, no external electrode is necessary or one external electrode is provided. For the wireless charging coils, the magnetic resonance coils, the NFC antennas, etc., two or more external electrodes are provided.

Figure 4:
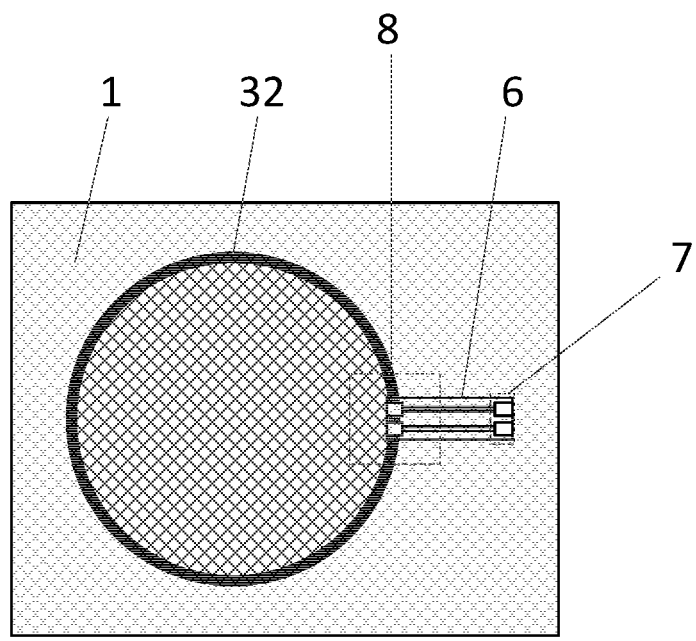
FIG. 4 is a structural schematic diagram of a flexible RF coil according to another embodiment of the present disclosure.

FIG. 4 is a structural schematic diagram of a flexible RF coil according to another embodiment of the present disclosure. As shown in FIG. 4, in some embodiments, the flexible RF coil further includes: one or more FPC connectors 6 between the first adhesive film layer 2 and the second adhesive film layer 3. A first end of the FPC connector 6 is lapped with the liquid metal coil 32, and a second end is led out from the first fabric layer 1 or the second fabric layer 5.

In some embodiments, the FPC connector 6 can adopt a three-layer structure, that is, a structure including a PI film, a conductive circuit, and a PI film. Two ends of the conductive circuit are exposed outside of the PI film. An electrode at the first end of the FPC connector is connected to the second end for connecting the liquid metal coil 32 and the external circuit. The materials of the conductive circuit are not limited to conductive metals such as copper and aluminum. In embodiments of the present disclosure, by using the FPC connector as an intermediate member for connecting the liquid metal coil 32 and the external circuit, the direct connection between the liquid metal coil 32 and the external circuit is avoided, and the welding requirement of the liquid metal coil 32 is reduced. Meanwhile, the conventional FPC connector is connected to the external circuit, which improves the structural stability and reliability of the flexible RF coil.

In some embodiments, the second end of the FPC connector 6 is led out from the first fabric layer 1 and/or the second fabric layer 5. The position of the first fabric layer 1 and/or the second fabric layer 5 relative to the second end of the FPC connector 6 is a window structure 7, and the end of the FPC connector 6 is exposed.

In some embodiments, a region of the first fabric layer 1 and/or the second fabric layer 5 that is lapped with the liquid metal coil 32 relative to the FPC connector 6 is an un-stretchable hardening region 8. In the present disclosure, by setting the lapping region between the FPC connector 6 and the liquid metal coil 32 as a non-stretchable structure, the friction and displacement between the liquid metal coil 32 and the end of the FPC connector 6 are avoided, and the oxidation of liquid metal due to friction can be alleviated. In some embodiments, the manner for setting the lapping region between the FPC connector 6 and the liquid metal coil 32 to be the non-stretchable hardening region 8 is not limited to locally providing a non-stretchable reinforcing sheet (such as PI film, PET film, etc.), or directly coating the hardening glue in this region to form a non-stretchable hardening region after the hardening glue is cured. In some embodiments, the hardening region 8 is achieved by hardening glue. The hardening glue can directly penetrate into the fabric layer, so that the overall thickness of the flexible RF coil is not increased. Since the hardening glue directly penetrates into the fabric layer, it can be stably bonded with the fabric layer, so that they are not liable to delaminating and peeling.

Another object of the present disclosure is to propose a method for manufacturing a flexible RF coil, so as to solve the problems of complex process, low efficiency, and unfavorable environmental protection in the related art.

Figure 5:
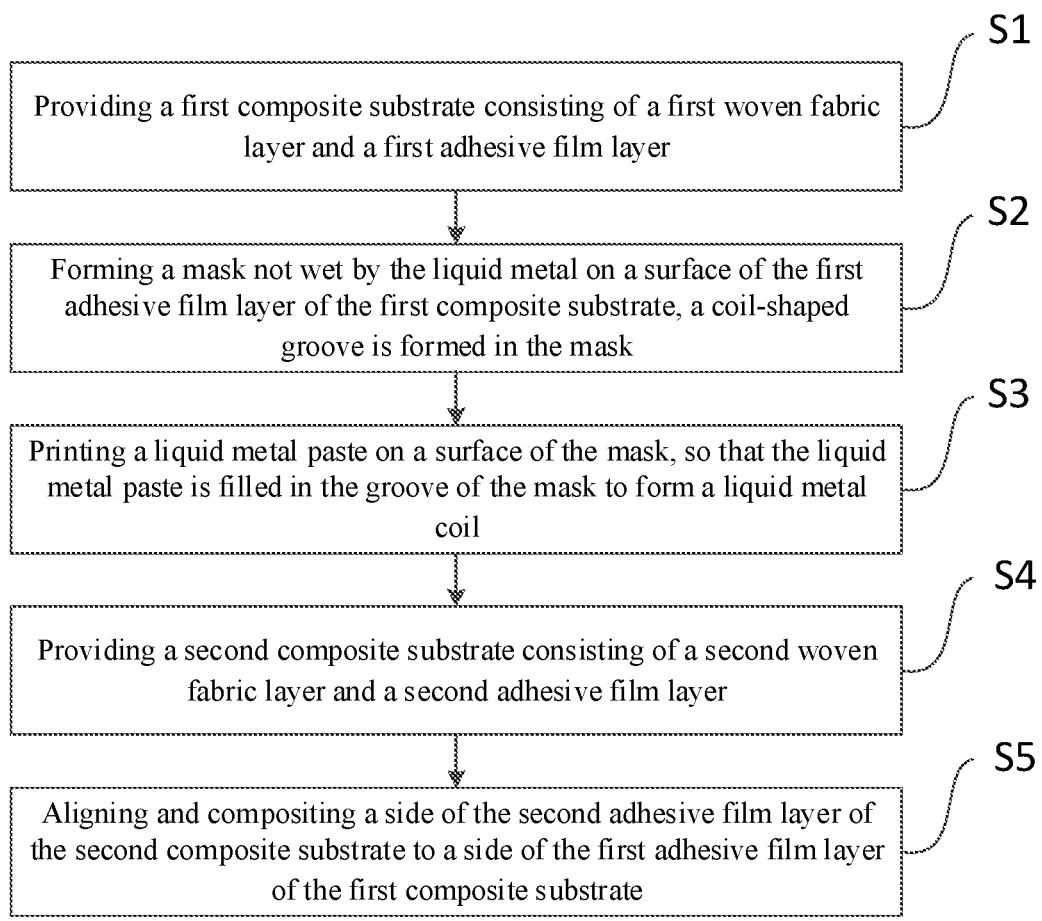
FIG. 5 is a flow chart for manufacturing a flexible RF coil according to an embodiment of the present disclosure.

FIG. 5 is a flowchart of a method for manufacturing a flexible RF coil according to an embodiment of the present disclosure. As shown in FIG. 5, the method for manufacturing a flexible RF coil includes the following steps.

In step S1, a first composite substrate consisting of a first fabric layer and a first adhesive film layer is provided.

In step S2, a mask not wet by the liquid metal is formed on the surface of the first adhesive film layer of the first composite substrate, and a coil-shaped groove is formed in the mask.

The mask not wet by the liquid metal in step S2 can be formed by directly printing a patterned carbon powder layer by a laser printer.

In step S3, a liquid metal paste is printed on the surface of the mask, so that the liquid metal paste is filled in the groove of the mask to form a liquid metal coil.

In some embodiments, the liquid metal paste is printed on the surface of the mask, and the liquid metal coil can be formed by using the selectivity of the mask and the adhesive film layer to the liquid metal paste by means of entire-surface coating.

In step S4, a second composite substrate consisting of a second fabric layer and a second adhesive film layer is provided.

In step S5, a second adhesive film layer side of the second composite substrate aligns and composites with a first adhesive film layer side of the first composite substrate.

The compositing manner in embodiments of the present disclosure is not limited to pressing, hot-pressing, and the like.

Figure 6:
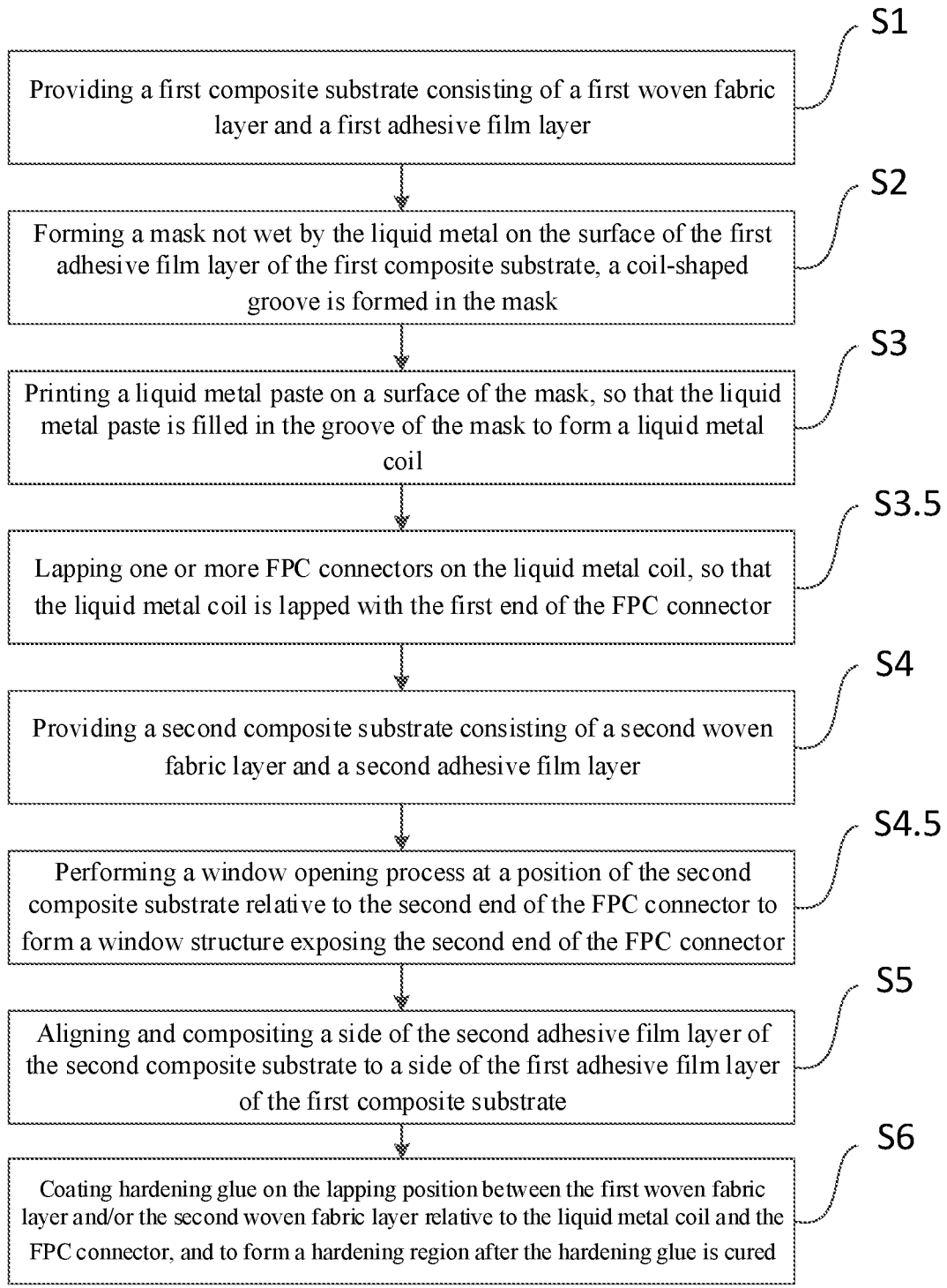
FIG. 6 is a flow chart for manufacturing a flexible RF coil according to another embodiment of the present disclosure.

FIG. 6 is a flow chart for manufacturing a flexible RF coil according to another embodiment of the present disclosure. As shown in FIG. 6, in some embodiments, between step S3 and step S4, a step S3.5 is included: one or more FPC connectors are lapped on the liquid metal coil, so that the liquid metal coil is lapped with the first end of the FPC connector.

In some embodiments, between step 4 and step 5, a step S4.5 is included: performing a window opening process at the position of the second composite substrate relative to the second end of the FPC connector, and forming a window structure exposing the second end of the FPC connector.

In some embodiments, after step S5, a step S6 is included.

In step S6, a hardening glue is coated on the lapping position between the first fabric layer and/or the second fabric layer relative to the liquid metal coil and the FPC connector, and after the hardening glue is cured, a hardening region is formed at this position.

The method for manufacturing a flexible RF coil in the embodiments of the present disclosure has the advantages of simple process, high efficiency and high precision. The method uses a traditional and mature laser printer to form a carbon powder layer as a mask, which can meet the user's personalized coil manufacturing, thereby improving the universality of the process.

Those skilled in the art shall further understand that the various illustrative logical blocks, modules, circuits, and algorithm steps described in connection with the embodiments herein may be implemented as electronic hardware, computer software, or combinations thereof. To clearly illustrate this interchangeability between hardware and software, various illustrative components, blocks, modules, circuits, and steps have been described above generally in terms of their functionality. Whether this functionality is implemented as hardware or software depends on the specific application and design constraints imposed on the overall system. Those skilled in the art may implement the described functionality in varying ways for various specific applications. However, such implementation decisions should not be interpreted as a departure from the scope of the present disclosure.

What is claimed is:

1. A flexible radio frequency (RF) coil, comprising:
   a first fabric layer,
   a first adhesive film layer,
   an RF printing layer,
   a second adhesive film layer, and
   a second fabric layer;
   wherein the first adhesive film layer is composited on a surface of the first fabric layer, the second adhesive film layer is composited on a surface of the second fabric layer;
   the RF printing layer is encapsulated between the first adhesive film layer and the second adhesive film layer;
   the RF printing layer comprises a mask not wet by a liquid metal, and a liquid metal coil formed in a coil-shaped groove reserved in the mask; and
   the first fabric layer and the second fabric layer are made of a fabric with stretchable extend of not less than 1% and not higher than 30%, and the mask not wet by the liquid metal is a patterned carbon powder layer printed by a laser printer.

2. The flexible RF coil according to claim 1, further comprising: one or more flexible print circuit (FPC) connectors between the first adhesive film layer and the second adhesive film layer, wherein a first end of each of the FPC connectors is lapped with the liquid metal coil, and a second end of each of the FPC connectors is led out from the first fabric layer or the second fabric layer.

3. The flexible RF coil according to claim 2, wherein leading out the second end of the FPC connector from the first fabric layer and/or the second fabric layer comprises:
   a position of the first fabric layer and/or a position of the second fabric layer relative to the second end of the FPC connector is a window structure, and the end of the FPC connector is exposed from the window structure.

4. The flexible RF coil according to claim 2, wherein a region of the first fabric layer and/or the second fabric layer that is lapped with the liquid metal coil relative to the FPC connector is a non-stretchable hardening region.

5. The flexible RF coil according to claim 1, wherein the first fabric layer and/or the second fabric layer is a fabric blended by polyester and spandex with stretchable extent of 5%-15%.

6. The flexible RF coil according to claim 1, wherein the first adhesive film layer and/or the second adhesive film layer is a thermoplastic adhesive film or a pressure-sensitive adhesive film.

7. The flexible RF coil according to claim 1, wherein at least conductive metal particles are mixed in the liquid metal.

* * * * *